United States Patent Office 3,144,419
Patented Aug. 11, 1964

3,144,419
POLYURETHANE FROM PHENOL-ALDEHYDE
RESINS CONTAINING PHOSPHORUS
Alvin Guttag, Bethesda, Md., assignor, by mesne assignments, to Union Carbide Corporation, a corporation of New York
No Drawing. Filed July 14, 1961, Ser. No. 124,019
12 Claims. (Cl. 260—2.5)

This invention relates to phosphorus containing compounds and polyurethanes made therefrom.

An object of the present invention is to make novel phosphite esters of phenol-aldehyde resin.

Another object is to prepare novel phosphates and thiophosphates of phenol-aldehyde resins.

A further object is to prepare novel polymers from phosphorus containing phenol-aldehyde resins.

An additional object is to prepare polyurethanes having improved fire and flame resistance.

A still further object is to prepare foamed polyurethanes from phenol-aldehyde resins containing phosphorus containing groupings.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by transesterifying an oxyalkylated phenol-aldehyde polymer with a tris hydrocarbon phosphite or tris haloaryl phosphite to form a phosphite containing resin. One, two or three phenol or alcohol groups can be removed from the tris substituted phosphite during the transesterification. Preferably, all three groups are removed since the resulting compounds are more stable. The phosphites obtained during this transesterification can be used as stabilizers for vinyl chloride resins, e.g., in an amount of 1%, as stabilizers for polyalkylene glycols, e.g., dipropylene glycol, diethylene glycol, polypropylene glycol 2025, antioxidants for natural rubber and synthetic rubber, e.g., butadiene-styrene copolymer, or as stabilizers for polyethylene and polypropylene.

The phosphite containing oxyalkylated phenol-aldehyde resins can be converted to the corresponding phosphates by oxidation, e.g., with hydrogen peroxide, and can be converted to the corresponding thiophosphates by treatment with sulfur. The phosphates and thiophosphates are useful as plasticizers for synthetic resins, e.g., polyurethanes and vinyl chloride resins.

The phosphites, phosphates and thiophosphates of the present invention are particularly useful for incorporation into urethane systems where they react with the isocyanato groups in the growing polymer chain and thus become fixed. They can be the sole hydroxyl reactant present or they can be used in admixture with other polyhydroxy compounds in forming the polyurethanes. Foamed polyurethanes can be obtained by adding water prior to or simultaneously with the addition of the polyisocyanate. Alternatively, there can be uniformly distributed a liquefied halogen substituted alkane containing at least one fluorine in its molecule in liquid form, having a boiling point at one atmosphere pressure not higher than 80° F. and preferably not lower than —60° F. in either the phosphorus containing polymer reactant or the polyisocyanate reactant and then mixing the reactants and permitting the temperature of the mixture to rise during the ensuing reaction above the boiling point of the liquefied gas to produce a porous polyurethane.

Such fluorine containing compounds include dichlorodifluoromethane, dichloromonofluoromethane, chlorodifluoromethane, dichlorotetrafluoroethane. The foams can be formed with such fluorine containing compounds in the manner described in General Tire British Patent 821,342.

Foamed polyurethanes can be made by either the one shot or two step procedure.

The polyurethanes prepared according to the present invention are solids. They have good flame-proofing properties and in the foamed form are useful as linings for textiles, e.g., coats, insulation in building constructions, upholstery filling material, pillows, etc. The unfoamed polyurethane products are useful wherever elastomeric polyurethanes can be employed with the advantage of improved flame and fire resistance. The elastomers can be cured in an oven, e.g., at 110° C. The elastomers in thread form can be employed in making girdles, etc.

As examples of polyisocyanates which can be employed to make the polyurethane there can be used toluene-2,4-diisocyanate; toluene-2,6-diisocyanate; 4 - methoxy - 1,3 - phenylene-diisocyanate; 4 - chloro - 1,3 - phenylene-diisocyanate; 4-isopropyl-1,3-phenylene diisocyanate; 4-ethoxy-1,3 - phenylene - diisocyanate; 2,4-diisocyanatodiphenylether; 3,3-dimethyl - 4,4 - diisocyanatodiphenylmethane; mesitylene diisocyanate; durylene diisocyanate; 4,4'-methylenebis (phenylisocyanate), benzidine diisocyanate, o-nitrobenzidine diisocyanate; 4,4' - diisocyanatodibenzyl; 1,5-naphthalene diisocyanate; tetramethylene diisocyanate and hexamethylene diisocyanate. Triisocyanates such as toluene 2,4,6-triisocyanate and 2,4,4'-triisocyanatodiphenylether can be used to provide additional crosslinking.

Any of the conventional basic catalysts employed in polyurethane foam technology can be used. These include N-methyl morpholine, N-ethyl morpholine, triethylamine and other trialkylamines, 3-diethylaminopropionamide, heat activated catalysts such as triethylamine citrate, 3-morpholinopropionamide, 2-diethylaminoacetamide, etc. In utilizing one shot systems there can be included especially active catalysts such as triethylenediamine, dibutyltin dilaurate, dibutyltin diacetate, di-2-ethylhexyltin oxide, dibutyltin monolaurate, octylstannoic acid, dibutyltin diethoxide.

Conventional surfactants can be added such as polydimethyl siloxane (50 centistokes grade); triethoxy dimethyl polysiloxane molecular weight 850 copolymerized with a dimethoxypolyethylene glycol having a molecular weight of 750 and any of the other siloxanes disclosed in Hostettler French Patent 1,212,252.

The novel hydroxy containing phosphites, phosphates and thiophosphates can be used as the sole hydroxyl group containing compounds in forming the polyurethanes or they can be replaced in part by other polyhydroxy containing compounds such as polyethylene glycol having molecular weights of 400 to 3000, polypropylene glycol having molecular weights of 400 to 3000, ethylene glycol, diethylene glycol, triethylene glycol, propylene glycol, dipropylene glycol, tripropylene glycol, 1,4-butanediol, thiodiglycol, glycerol, trimethylolethane, trimethylolpropane, glycerine-propylene oxide adduct, 1,2,6-hexanetriol-propylene oxide adducts having molecular weights of 500, 700, 1500, 2500, 3000 or 4000, trimethylolphenol, triethanolamine, pentaerythritol, methyl glucoside, castor oil, glycerine ethylene oxide adducts, diethanolamine, etc. Hydroxyl containing polyesters can be used, e.g., mixed ethylene glycol-propylene glycol-adipate resin, polyethylene adipate-phthalate, polyneopentylene sebacate.

Other suitable modifying reactants include the product made by reacting a molar excess of 1,4-butanediol with adipic acid and including a small amount of a triol, e.g., one molar equivalent of trimethylolpropane for each 3000 to 12,000 molecular weight units of polyester, thiodiglycol, polytetramethylene formal glycol, LG–56 (glycerine-propylene oxide adduct with a molecular weight of 3000).

While the polyurethanes in general are solids, the phosphites, phosphates and thiophosphates from which they are made are normally liquids due to the amount of oxyalkylation or the incomplete resinification of the phenol-aldehyde resin.

As the oxyalkylated phenol-aldehyde resins there can be employed the hydrophylic organic reaction products of (A) an alpha-beta alkylene oxide having not more than 4 carbon atoms selected from the group consisting of ethylene oxide, propylene oxide, butylene oxide, glycide and methyl glycide with (B) an oxyalkylation susceptible fusible phenolaldehyde resin. The oxyalkylated phenol-aldehyde resins are characterized by the introduction into the resin molecule of a plurality of divalent radicals having the formula $(R_1O)_n$ in which $R_1$ is a member of the class consisting of ethylene radicals, propylene radicals, butylene radicals, hydroxy propylene radicals and hydroxy butylene radicals and $n$ is a number varying from 1 to 20; with the proviso that an average of at least 2 moles of alkylene oxide be introduced for each phenol-aldehyde resin unit. The most preferred alkylene oxide is propylene oxide and next to propylene oxide it is preferred to use ethylene oxide.

As starting phenol-aldehyde resins there can be used, for example, any of those disclosed in De Groote patent 2,499,365. As the oxyalkylated phenol-aldehyde resin there can be employed any of the hydrophylic oxyalkylated phenol-aldehyde resins of De Groote. The entire disclosure of the De Groote patent is hereby incorporated by reference. Particularly pertinent portions of De Groote are column 6, lines 48–68, Examples 1a–188a, inclusive, Examples 203a–211a, inclusive, Examples 258a–321a, inclusive, Examples 324a–339a, inclusive, column 91, line 72, to column 92, line 17, column 92, lines 55–72, column 93, line 9, to column 95, line 23, column 97, line 14, to column 99, line 72, Examples 1b–19b, inclusive, Examples 24b–26b, inclusive, Example 43b, Examples 48b–61b, inclusive, Example 66b, Example 74b, column 124, line 53, to column 125, line 17, column 125, line 39, to column 126, line 39 and all of the tables showing oxyalkylation on columns 125–130, inclusive, the tables on columns 131–136, inclusive, except for those portions referring to Examples 200a, 201a, 202a, 195a, 196a, 197a, 213a, 239a, 257a, 351a, and 344a through 376a.

Thus, any of the oxyalkylated phenolaldehyde resins of De Groote can be employed as starting materials in the present invention. Preferably, the resin employed has a hydrocarbon or halogen substituent in the ortho or para position to the phenolic hydroxyl, most preferably in the para position. However, as indicated, trifunctional or higher functional phenols can be employed. When using phenol per se or meta cresol, for example, novolaks can be used. Alternatively, resoles can be employed providing the phenol-formaldehyde resin, for example, has not reached the infusible stage.

As examples of phenols which can be used mention is made of phenol, m-cresol, o-cresol, p-cresol, o-chlorophenol, p-chlorophenol, m-chlorophenol, p-bromophenol, p-fluorophenol, p-ethylphenol, p-butylphenol, p-tertiary butylphenol, p-phenylphenol, o-tertiary butylphenol, p-secondary butylphenol, p-tertiary amylphenol, p-secondary amylphenol, p-cyclohexylphenol, resorcinol, 3,4-xylenol, bisphenol A, o-tertiary amylphenol, p-tertiary hexylphenol, p-octylphenol, p-styrylphenol, cresylic acid, p-nonylphenol, p-dodecylphenol, o-dodecylphenol, p-nonylphenol, p-menthylphenol, p-decylphenol, p-cumylphenol, p-octadecylphenol, p-eicosanylphenol, p-tetraicosanylphenol, p-isopropylphenol, o-isopropylphenol, thymol, carvacrol, alpha-naphthol, beta-napthhol, hydroquinone and cardanol. As the aldehyde there can be used formaldehyde, furfural, acetaldehyde, propionaldehyde.

Preferably, the phenol has an alkyl substituent of 1 to 24 carbon atoms in the para position or in the ortho position. The preferred aldehyde is formaldehyde. Preferably, the resins have 3 to 7 phenolic nuclei with an average of 4.5 to 5.5 nuclei. However, the resins can have 15 or even more structural units (as shown on column 99 of the De Groote patent).

As previously stated, there should be used at least two moles of alkylene oxide or hydroxy alkylene oxide per structural unit of the phenol-aldehyde resin. There can be used more of the alkylene oxide, e.g., 6 to 1; 10 to 1; 15 to 1 or 20 to 1 moles per structural unit of the resin. For use in forming foamed polyurethanes desirably at least 6 moles of alkylene oxide, preferably propylene oxide, are used per structural unit.

For the transesterification of the oxyalkylated phenol-aldehyde resin there can be used trihydrocarbon or trihaloaryl phosphites including trialkyl and triaryl phosphites such as triphenyl phosphite, tri-o-cresyl phosphite, tri-m-cresyl phosphite, tri-p-cresyl phosphite, tri-xylenyl phosphite, tridecyl phosphite, diphenyl decyl phosphite and triethyl phosphite as well as tri-haloaryl phosphites such as tri-p-chlorophenyl phosphite, tri-o-chlorophenyl phosphite, etc.

Preferably, the reaction between the oxyalkylated phenol-aldehyde resin and the tri-hydrocarbon phosphite is catalyzed by a dihydrocarbon (e.g., aryl or alkyl) or dihaloaryl phosphite, e.g., 0.1–1% of diphenyl phosphite, di-o-cresyl phosphite, di-p-cresyl phosphite, dimethyl phosphite, diethyl phosphite, didecyl phosphite, dioctadecyl phosphite, di-p-chlorophenyl phosphite, etc. Such catalysts are neutral and are particularly advantageous with thermosetting resins since alkaline catalysts tend to advance the resin.

Alkaline catalysts can be employed for the transesterification. Such catalysts preferably have a pH of at least 11 in a 0.1 N solution. Examples of these catalysts are sodium phenolate, sodium cresylate, sodium methylate, potassium phenolate and sodium decylate. They are employed in an amount of 0.1–1% of the reactants.

Unless otherwise indicated, all parts and percentages are by weight.

In preparing urethane foams according to the invention a rigid foam is made by utilizing a hydroxyl compound or mixture of hydroxyl compounds having a hydroxyl number of 350–750; a semi-rigid foam is prepared if the hydroxyl number is 75–350 and a flexible foam is prepared if the hydroxyl number is 35–75.

In general, the higher the alkyl group the lower the hydroxyl number. Also, the lower the molecular weight of the alkylene oxide the higher the hydroxyl number (providing there is not an extra hydroxyl group on the alkylene oxide). In preparing urethane foams (and other urethane polymers) the following values are of interest.

| Resin | No. of Units in Resin | Hydroxyl Number ||||||| 
|---|---|---|---|---|---|---|---|---|
| | | 15E | 3E | 3P | 15P | 6P | 10E | 10P | 20P |
| Phenolformaldehyde | 5 | ---- | 190 | 160 | 46 | ------ | 82 | 65 | 35 |
| Do | 7 | ---- | ------ | 170 | ---- | 106 | ---- | ---- | ---- |
| Cresolformaldehyde | 5 | ---- | 178 | 153 | ---- | ------ | ---- | 64 | ---- |
| Do | 7 | ---- | ------ | 163 | ---- | 103 | ---- | ---- | ---- |
| Butylphenolformaldehyde | 5 | 55 | 150 | 134 | 43 | 88 | 74 | 60 | 34 |
| Do | 7 | ---- | ------ | 143 | ---- | 94 | ---- | 65 | ---- |
| Amylphenolformaldehyde | 5 | ---- | ------ | 122 | ---- | ------ | ---- | ---- | ---- |
| Do | 7 | ---- | ------ | ------ | ---- | 91 | ---- | ---- | ---- |
| Octylphenolformaldehyde | 5 | ---- | ------ | 115 | ---- | ------ | ---- | 68 | 56 | ---- |
| Do | 7 | ---- | ------ | ------ | ---- | 85 | ---- | ---- | ---- |
| Chlorophenolformaldehyde | 5 | ---- | ------ | 150 | ---- | ------ | ---- | 63 | ---- |

In the above table the term 3E signifies three ethylene oxide groups per resin unit, 3P signifies three propylene oxide groups per resin unit, 6P signifies six propylene oxide groups per resin unit, 10E signifies ten ethylene oxide groups per resin unit, 10P signifies ten propylene oxide groups per resin unit, 15P signifies fifteen propylene oxide groups per resin unit, 15E signifies fifteen ethylene oxide groups per resin unit, and 20P signifies twenty propylene oxide groups per resin unit.

Unless otherwise indicated, in the following examples the oxyalkylated phenol-formaldehyde resins had about 5 phenol units in the molecule.

*Example 1*

One mole of the oxyethylated p-tertiary butylphenol-formaldehyde resin of Example 1b of the De Groote patent (having about 5 phenol units in the resin molecule and 11 moles of ethylene oxide per phenol unit) was mixed with one mole of triphenyl phosphite (310 grams) and 3 grams of diphenyl phosphite. The mixture was heated in vacuo (10 mm.) at 120° C. and phenol was collected until approximately 3 moles had distilled over. The tris oxyethylated p-tertiary butylphenol-formaldehyde resin phosphite formed was a viscous liquid and can be represented by the formula

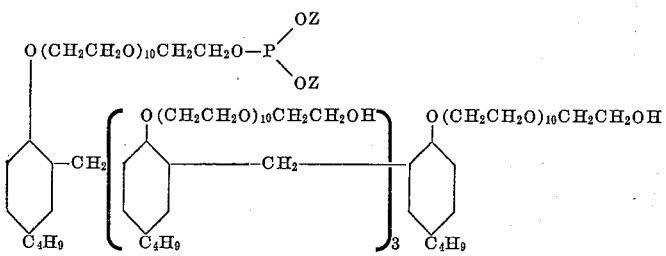

where Z is the grouping

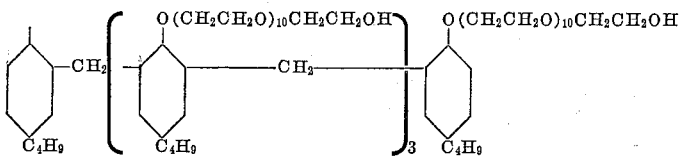

This formula is representative only and the ester linkages for the phosphorus, for example, might be present on other units of the resin molecule instead.

*Example 2*

One mole of the oxypropylated p-tertiary butylphenol-formaldehyde resin of Example 2b of De Groote (containing about 8.6 moles of ethylene oxide per phenol unit in the resin molecule) was mixed with one mole of triphenyl phosphite and 2 grams of diphenyl phosphite. The mixture was heated in vacuo (10 mm.) at 120° C. and the phenol formed was distilled and collected until about 3 moles had distilled over. The tris oxypropylated p-tertiary butylphenol-formaldehyde resin phosphite formed was a viscous liquid.

*Example 3*

The process of Example 2 was repeated but distillation was stopped when one mole of phenol had come over. The product was monoorypropylated p-tertiary butylphenol-formaldehyde resin phosphite.

*Example 4*

The process of Example 1 was repeated using an oxyethylated phenol-formaldehyde novolak having 3 ethylene oxide groups per phenol unit in the resin molecule. There was recovered the tris oxyethylated phenol-formaldehyde resin phosphite.

*Example 5*

The process of Example 4 was repeated but there was used an oxypropylated phenol-formaldehyde novolak having 3 propylene oxide groups per phenol unit in the resin molecule. There was recovered the tris oxypropylated phenol-formaldehyde resin phosphite after removal of three moles of phenol by distillation.

*Example 6*

The process of Example 5 was repeated but the oxypropylated phenol-formaldehyde novolak employed had 15 propylene oxide groups per phenol unit in the resin molecule. There was recovered the tris oxypropylated phenol-formaldehyde novolak phosphite as a viscous liquid after recovery of three moles of phenol.

*Example 7*

The process of Example 4 was repeated utilizing an oxyethylated phenol-formaldehyde novolak having 10 ethylene oxide groups per phenol unit in the resin molecule.

*Example 8*

The process of Example 5 was repeated but the oxypropylated phenol-formaldehyde novolak employed had 10 propylene oxide groups per phenol unit in the resin molecule.

*Example 9*

The process of Example 5 was repeated but the oxypropylated phenol-formaldehyde novolak employed had 20 propylene oxide groups per phenol unit in the resin molecule.

*Example 10*

One mole of oxypropylated thermosetting phenol-formaldehyde resin having 15 propylene oxide groups per phenol unit was mixed with one mole of triphenyl prosphite and 2 grams of didecyl phosphite. The mixture was heated in vacuo (10 mm.) and three moles of phenol removed by distillation to recover the tris oxypropylated phenol-formaldehyde resin phosphite.

*Example 11*

One mole of oxypropylated phenol-formaldehyde novolak having 7 phenol units in the resin molecule and having 6 propylene oxide groups per phenol unit was mixed with one mole of trioctyl phosphite and 2 grams of dioctyl phosphite. The mixture was heated in vacuo (10 mm.) until three moles of octyl alcohol were removed by distillation to recover the tris oxypropylated phenol-formaldehyde novolak phosphite.

*Example 12*

One mole of oxypropylated p-cresol-formaldehyde resin having 5 cresol units in the resin molecule and having 3 ethylene oxide groups per cresol unit was mixed with one mole (310 grams) of triphenyl phosphite and 3 grams of diphenyl phosphite. The mixture was heated in vacuo (10 mm.) until three moles of phenol were removed by distillation to recover the tris oxyethylated cresol-formaldehyde resin phosphite.

Example 13

The process of Example 12 was repeated replacing the oxyethylated p-cresol-formaldehyde resin by an oxypropylated o-cresol-formaldehyde resin having 3 propylene oxide units per cresol unit. The product recovered was tris oxypropylated o-cresol-formaldehyde resin phosphite.

Example 14

The process of Example 13 was repeated using oxypropylated p-cresol-formaldehyde resin having 5 cresol units in the resin molecule and having 10 propylene oxide units per cresol unit. The tris oxypropylated o-cresol-formaldehyde resin phosphite was recovered as a substantially colorless viscous liquid.

Example 15

One mole of oxypropylated p-cresol-formaldehyde resin having 7 cresol units in the resin molecule and having 6 propylene oxide groups per cresol unit was mixed with one mole of triphenyl phosphite and 3 grams of diphenyl phosphite. The mixture was heated in vacuo (10 mm.) until about three moles of phenol were removed by distillation to recover the tris oxypropylated p-cresol-formaldehyde resin phosphite.

Example 16

One mole of oxypropylated p-tertiary butylphenol-formaldehyde resin having 5 butylphenol units in the resin molecule and having 2 propylene oxide groups per butylphenol unit was mixed with one mole of triphenyl phosphite and 3 grams of diphenyl phosphite. The mixture was heated in vacuo (10 mm.) until about three moles of phenol were removed by distillation to recover the tris oxypropylated p-tertiary butylphenol-formaldehyde resin phosphite.

Example 17

One mole of oxyethylated o-n-butylphenol-formaldehyde resin having 5 butylphenol units in the resin molecule and having 3 ethylene oxide groups per butylphenol unit was mixed with one mole of triphenyl phosphite and 3 grams of dicresyl phosphite. The mixture was heated in vacuo (10 mm.) until three moles of phenol were removed by distillation to recover the tris oxyethylated o-n-butylphenol-formaldehyde resin phosphite.

Example 18

The process of Example 17 was repeated using oxyethylated p-secondary butylphenol-formaldehyde resin having 15 ethylene oxide groups per butylphenol unit. There was recovered tris oxyethylated p-secondary butylphenol-formaldehyde resin phosphite as a viscous liquid.

Example 19

One mole of oxypropylated p-tertiary butylphenol-formaldehyde resin having 5 butylphenol units in the resin molecule and having 3 propylene oxide groups per butylphenol unit was mixed with one mole of triphenyl phosphite and 3 grams of diphenyl phosphite. The mixture was heated in vacuo (10 mm.) until about three moles of phenol were removed by distillation to recover the tris oxypropylated p-tertiary butylphenol-formaldehyde resin phosphite.

Example 20

One mole of oxypropylated p-tertiary butylphenol-formaldehyde resin having 5 butylphenol units in the resin molecule and having 15 propylene oxide groups per butylphenol unit was mixed with one mole of triphenyl phosphite (310 grams) and 2.5 grams of diphenyl phosphite. The mixture was heated in vacuo (10 mm.) until about three moles of phenol were removed by distillation to recover the tris oxypropylated p-tertiary butylphenol-formaldehyde resin phosphite as a viscous liquid.

Example 21

The process of Example 20 was repeated but the oxypropylated p-tertiary butylphenol-formaldehyde resin employed had 6 propylene oxide groups per butylphenol unit.

Example 22

One mole of oxypropylated p-tertiary butylphenol-formaldehyde resin having 5 butylphenol units in the resin-molecule and having 10 propylene oxide groups per butylphenol unit was mixed with one mole of triphenyl phosphite and 3 grams of diphenyl phosphite. The mixture was heated in vacuo (10 mm.) until about three moles (282 grams) of phenol were removed by distillation to recover the tris oxypropylated p-tertiary butylphenol-formaldehyde resin phosphite as a colorless viscous liquid.

Example 23

The process of Example 22 was repeated replacing the oxypropylated resin by one mole of oxyethylated p-tertiary butylphenol-formaldehyde resin having 10 ethylene oxide groups per butylphenol unit. The product recovered was tris oxyethylated p-tertiary butylphenol-formaldehyde resin phosphite as a liquid.

Example 24

The process of Example 22 was repeated replacing the oxypropylated resin by one mole of oxypropylated p-tertiary butylphenol-formaldehyde resin having 20 propylene oxide groups per butylphenol unit. The product recovered was tris oxypropylated p-tertiary butylphenol-formaldehyde resin phosphite as a colorless liquid.

Example 25

The process of Example 22 was repeated replacing the oxypropylated resin by one mole of oxypropylated p-n-butylphenol-butyraldehyde resin having 10 propylene oxide groups per butylphenol unit. The product recovered was tris oxypropylated p-n-butylphenol-butyralderesin phosphihte as a colorless liquid.

Example 26

The process of Example 22 was repeated replacing the oxypropylated resin by one mole of oxypropylated p-tertiary butylphenol-furfural resin having 10 propylene oxide groups per butylphenol unit. The product recovered was tris oxypropylated p-tertiary butylphenol-furfural resin phosphite.

Example 27

The process of Example 22 was repeated replacing the oxypropylated resin by one mole of oxypropylated p-tertiary butylphenol-formaldehyde resin having 7 butylphenol units in the resin molecule and having 6 propylene oxide groups per butylphenol unit. The product recovered was tris oxypropylated p-tertiary butylphenol-formaldehyde resin phosphite.

Example 27a

The process of Example 22 was repeated replacing the oxypropylated resin by one mole of oxypropylated p-tertiary butylphenol-formaldehyde resin having 7 butylphenol units in the resin molecule and having 10 propylene oxide groups per butylphenol unit. The product recovered was tris oxypropylated p-tertiary butylphenol-formaldehyde resin phosphite as a liquid.

Example 28

The process of Example 22 was repeated replacing the oxypropylated resin by one mole of oxypropylated p-tertiary amylphenol-formaldehyde resin having 5 amylphenol units in the resin molecule and having 3 propylene oxide groups per amylphenol unit. The product recovered was tris oxypropylated p-tertiary amylphenol-formaldehyde resin phosphite.

*Example 29*

The process of Example 28 was repeated but the oxypropylated amylphenol-formaldehyde resin had 10 propylene oxide groups per amylphenol unit. The phosphite product recovered was a viscous liquid.

*Example 30*

The process of Example 22 was repeated replacing the oxypropylated resin by one mole of oxypropylated p-tertiary amylphenol-formaldehyde resin having 7 amylphenol units in the resin molecule and having 6 propylene oxide groups per amylphenol unit. The product recovered was tris oxypropylated p-tertiary amylphenol-formaldehyde resin phosphite.

*Example 31*

The process of Example 22 was repeated replacing the oxypropylated resin by one mole of oxypropylated octylphenol-formaldehyde resin having 5 octylphenol units in the resin molecule and having 2 propylene oxide groups per octylphenol unit. The product recovered was tris oxypropylated p-octylphenol-formaldehyde resin phosphite.

*Example 32*

The process of Example 31 was repeated but the oxypropylated p-octylphenol-formaldehyde resin used had 10 propylene oxide groups per octylphenol unit. The tris oxypropylated p-octylphenol-formaldehyde resin phosphite recovered was a viscous liquid.

*Example 33*

The process of Example 31 was repeated but the oxypropylated p-octylphenol-formaldehyde resin used had 3 propylene oxide groups per octylphenol unit.

*Example 33a*

The process of Example 31 was repeated but the starting resin was replaced by oxyethylated p-octylphenol-formaldehyde resin having 10 ethylene oxide groups per octylphenol unit. The tris oxyethylated p-octylphenol-formaldehyde resin phosphite was a viscous liquid.

*Example 34*

The process of Example 31 was repeated but the oxypropylated resin employed was oxypropylated p-octylphenol-formaldehyde resin having 7 octylphenol units and having 6 propylene oxide groups per octylphenol unit.

*Example 35*

The process of Example 22 was repeated but the starting resin was oxypropylated p-dodecylphenol-formaldehyde resin having 10 propylene oxide groups per dodecylphenol unit. There was recovered tris oxypropylated dodecylphenol-formaldehyde resin phosphite as a liquid.

*Example 36*

The process of Example 22 was repeated but the starting resin was oxypropylated p-chlorophenol-formaldehyde resin having 10 propylene oxide groups per chlorophenol unit. There was recovered tris oxypropylated p-chlorophenol-formaldehyde resin phosphite as a liquid.

*Example 37*

The process of Example 36 was repeated but the starting oxypropylated resin had 3 propylene oxide groups per chlorophenol unit.

*Example 38*

The process of Example 22 was repeated replacing the starting resin with p-nonylphenol-formaldehyde resin having 5 nonylphenol units in the resin molecule and having 2 ethylene oxide units per nonylphenol unit. There was recovered tris oxyethylated p-nonylphenol-formaldehyde resin phosphite.

As previously indicated, the corresponding phosphates can be prepared by oxidizing the corresponding phosphites, e.g., with hydrogen peroxide (either 30% or 50% concentration) or other peroxy compounds, e.g., peracetic acid. The peroxy compound is used in an amount which is stoichiometrically equivalent to the amount of phosphorus present.

*Example 39*

To the tris oxypropylated p-tertiary butylphenol-formaldehyde resin phosphite of Example 22 there was added an equimolecular amount of 50% aqueous hydrogen peroxide. After reaction was complete, the water was distilled off leaving a residue of tris oxypropylated p-tertiary butylphenol-formaldehyde resin phosphate as a liquid.

In place of the phosphite resin of Example 22 in a similar manner there can be converted into phosphates any of the other phosphite resins of Examples 1–21 and 23–38.

*Example 40*

To the tris oxypropylated p-tertiary butylphenol-formaldehyde resin phosphite of Example 22 there was added an equimolecular amount of elemental sulfur. The mixture was heated to 110–130° C. for one hour. The product was tris oxypropylated p-tertiary butylphenol-formaldehyde resin thiophosphate as a liquid.

In place of the phosphite resin of Example 22 in a similar manner there can be converted into thiophosphates any of the other phosphite resins of Examples 1–21 and 23–38.

In the following Examples 41–69 a one shot foam was prepared by utilizing the following standard formulation in a 10 ounce cup.

| | Grams |
|---|---|
| Water | 0.37 |
| Dibutyltin dilaurate | 0.07 |
| Polydimethyl siloxane | 0.12 |
| N-ethyl morpholine | 0.1 |
| Polyol | As indicated |

This mixture is designated in the following examples as Formulation A.

Foams were made by adding Formulation A to 5.2 grams of toluene diisocyanate (a mixture of 80% of the 2,4-isomer and 20% of the 2,6-isomer). The foams prepared were placed in a 110° C. curing oven for 20 minutes.

The 80:20 mixture of toluene diisocyanates was used in all of the following examples.

*Example 41*

The polyol used in Formulation A was 15.4 grams of the tris oxypropylated p-tertiary butylphenol-formaldehyde resin phosphite prepared in Example 22. Upon addition of the 5.2 grams of toluene diisocyanate there was formed a solid polyurethane foam.

*Example 42*

The polyol used in Formulation A was the same as that in Example 41. The water was omitted from Formulation A and 5.2 grams of the toluene diisocyanate (80:20 ratio of 2,4 and 2,6-isomers) were added. After prepolymer formation was complete, there was added 0.37 gram of water with strong stirring to obtain a solid foamed product.

*Example 43*

The polyol used in Formulation A was a mixture of 7.7 grams of the polyol used in Example 41 together with 7.2 grams of LG–56. After addition of the 5.2 grams of toluene diisocyanate, there was obtained a nice solid foam.

*Example 44*

The polyol used in Formulation A was a mixture of 2.1 grams of the tris oxyethylated phenol-formaldehyde resin phosphite of Example 4 and 7 grams of polyproylene glycol 2025. Upon addition of 5.2 grams of toluene diisocyanate a solid foamed polymer was produced.

*Example 45*

The polyol used in Formulation A was a mixture of 2.5 grams of the tris oxypropylated phenol-formaldehyde resin phosphite of Example 5 and 7.2 grams of LG–56. Upon addition of 5.2 grams of toluene diisocyanate a solid foamed polymer was produced.

*Example 46*

The polyol used in Formulation A was 17.2 grams of the tris oxypropylated phenol-formaldehyde resin phosphite of Example 6. Upon addition of 5.2 grams of toluene diisocyanate a solid foamed polymer was produced.

A similar foam was prepared using the phosphite of Example 10.

*Example 47*

The polyol used in Formulation A was a mixture of 7.3 grams of the tris oxypropylated phenol-formaldehyde resin phosphite of Example 11 and 7.2 grams of LG–56. Upon addition of 5.2 grams of toluene diisocyanate a solid foamed polymer was produced.

*Example 48*

The polyol used in Formulation A was a mixture of 2.7 grams of the tris oxypropylated cresol-formaldehyde resin phosphite of Example 13 and 7.2 grams of LG–56. Upon addition of 5.2 grams of toluene diisocyanate a foamed polymer was produced.

*Example 49*

The polyol used in Formulation A was a mixture of 7 grams of the tris oxypropylated cresol-formaldehyde resin phosphite of Example 14 and 7 grams of polypropylene glycol 2025. Upon addition of 5.2 grams of toluene diisocyanate a solid foamed polymer was produced.

*Example 50*

The polyol used in Formulation A was a mixture of 2.5 grams of the tris oxyethylated butylphenol-formaldehyde resin phosphite of Example 16 and 7.2 grams of LG–56. Upon addition of 5.2 grams of toluene diisocyanate a solid foamed polymer was produced.

*Example 51*

The polyol employed in Formulation A was 14.4 grams of the tris oxyethylated butylphenol-formaldehyde resin phosphite of Example 18. Upon addition of 5.2 grams of toluene diisocyanate a solid foamed polymer was produced.

*Example 52*

The polyol employed in Formulation A was a mixture of 2.7 grams of the tris oxyethylated butylpenol-formaldehyde resin phosphite of Example 17 and 7.2 grams of LG–56. Upon addition of 5.2 grams of toluene diisocyanate a solid foamed polymer was produced.

*Example 53*

The polyol employed in Formulation A was a mixture of 9.3 grams of the tris oxypropylated butylphenol-formaldehyde resin phosphite of Example 20 and 7.2 grams of LG–56. Upon addition of 5.2 grams of toluene diisocyanate a solid foamed polymer was produced.

*Example 54*

The polyol employed in Formulation A was a mixture of 4.5 grams of the tris oxypropylated butylphenol-formaldehyde resin phosphite of Example 21 and 7.2 grams of polypropylene glycol 2025. A solid foam was formed upon the addition of 5.2 grams of toluene diisocyanate.

*Example 55*

The polyol employed in Formulation A was a mixture of 5.5 grams of the tris oxyethylated butylphenol-formaldehyde resin phosphite of Example 23 and 7.2 grams of LG–56. A solid foam was formed upon the addation of 5.2 grams of toluene diisocyanate.

*Example 56*

The polyol employed in Formulation A was a mixture of 12 grams of the tris oxypropylated butylphenol-formaldehyde resin phosphite of Example 24 and 7.2 grams of LG–56. The foam was produced upon the addition of 5.2 grams of toluene diisocyanate.

*Example 57*

The polyol employed in Formulation A was a mixture of 5.7 grams of the tris oxyethylated butylphenol-formaldehyde resin phosphite of Example 1 and 7.2 grams of polypropylene glycol 2025. The foam was produced upon the addition of 5.2 grams of toluene diisocyanate.

*Example 58*

The polyol employed in Formulation A was a mixture of 5.7 grams of the tris oxypropylated butylphenol-formaldehyde resin phosphite of Example 2 and 7.2 grams of LG–56. The solid foam was produced upon the addition of 5.2 grams of toluene diisocyanate.

*Example 59*

The polyol employed in Formulation A was a mixture of 3.8 grams of the tris oxypropylated butylphenol-formaldehyde resin phosphite of Example 27 and 7.2 grams of LG–56. A solid foam was produced upon the addition of 5.2 grams of toluene diisocyanate.

*Example 60*

The polyol employed in Formulation A was a mixture of 6 grams of the tris oxypropylated butylphenol-formaldehyde resin phosphite of Example 27 and 7.2 grams of LG–56. A solid foam was produced upon the addition of 5.2 grams of toluene diisocyanate.

*Example 61*

The polyol employed in Formulation A was 13.8 grams of the tris oxypropylated butylphenol-butyraldehyde resin phosphite of Example 25. A solid foam was formed upon the addition of 5.2 grams of toluene diisocyanate.

*Example 62*

The polyol employed in Formulation A was 14.4 grams of the tris oxypropylated butylphenol-furfural resin phosphite of Example 26. A solid foam was formed upon the addition of 5.2 grams of toluene diisocyanate.

*Example 63*

The polyol employed in Formulation A was 14.4 grams of the tris oxypropylated amylphenol-formaldehyde resin phosphite of Example 29. A solid foam was formed upon the addition of 5.2 grams of toluene diisocyanate.

*Example 64*

The polyol employed in Formulation A was a mixture of 3 grams of the tris oxypropylated octylphenol-formaldehyde resin phosphite of Example 31 and 7.2 grams of polypropylene glycol 2025. A solid foam was formed upon the addition of 5.2 grams of toluene diisocyanate.

*Example 65*

The polyol employed was a mixture of 6 grams of the tris oxyethylated octylphenol-formaldehyde resin phosphite in Example 33a and 7.2 grams of LG–56. A solid foam was formed upon the addition of 5.2 grams of toluene diisocyanate.

*Example 66*

The polyol employed was 14.4 grams of the tris oxypropylated octylphenol-formaldehyde resin phosphite of Example 32. A solid foam was formed upon the addition of 5.2 grams of toluene diisocyanate.

Example 66a

The polyol employed was a mixture of 6.5 grams of the tris oxypropylated chlorophenol-formaldehyde resin phosphite of Example 36 and 7.2 grams of LG–56. Upon the addition of 5.2 grams of toluene diisocyanate a solid foam was produced.

Example 67

The polyol employed was 14.4 grams of the tris oxypropylated dodecylphenol-formaldehyde resin phosphite of Example 35. Upon the addition of 5.2 grams of toluene diisocyanate a solid foam was produced.

Example 68

The polyol employed was a mixture of 2.9 grams of the tris oxypropylated nonylphenol-formaldehyde resin phosphite of Example 38 and 7.2 grams of LG–56. Upon the addition of 5.2 grams of toluene diisocyanate a solid foam was produced.

Example 69

The polyol employed was 14.4 grams of the tris oxypropylated butylphenol-formaldehyde resin phosphate of Example 39. Upon the addition of 5.2 grams of toluene diisocyanate a solid foam was produced.

Example 70

The polyol employed was 14.4 grams of the tris oxypropylated butylphenol-formaldehyde resin thiophosphate of Example 40. Upon the addition of 5.2 grams of toluene diisocyanate a solid foam was produced.

Example 71

237 grams (0.021 mole) of the tris oxypropylated butylphenol-formaldehyde resin phosphite of Example 22 and 95 grams (0.55 mole) of toluene diisocyanate were heated together at 90° C. for one hour and dissolved in 400 ml. of dimethyl formamide solvent and portions were painted on (a) a glass dish, (b) a steel plate and (c) a piece of wood. The samples were placed in an oven at 120° C. for one hour to remove the solvent and then air cured for 4 hours. In all cases a clear resin coating was obtained. The coating acted as a fire retardant. The polyurethane formed was useful therefore as a non-burning paint.

I claim:

1. A polyurethane prepared by the reaction of an organic polyisocyanate with a member of the group consisting of (1) phosphite, (2) phosphate and (3) thiophosphate esters of oxyalkylated phenol-aldehyde resin, said resin being characterized by etherification of the resin molecule at the phenolic oxygen thereof by a plurality of divalent oxyalkylene radicals having the formula $(R_1O)_n$ in which $R_1$ is a member of the group consisting of ethylene radicals, propylene radicals, butylene radicals, hydroxypropylene and hydroxybutylene radicals, $n$ is an integer from 1 to 20, the phosphorus being attached to a terminal oxygen of at least one of said divalent radicals, the remainder of said divalent radicals terminating in hydroxyl hydrogen.

2. A polyurethane comprising the reaction product of an organic polyisocyanate with a tris polyoxyalkylated phenol-aldehyde resin phosphite, said resin being characterized by etherification of the resin molecule at the phenolic oxygen by a plurality of divalent unsubstituted polyoxyalkylene radicals having the formula $(R_2O)_m$ where $R_2$ is an oxyalkylene group having 2 to 3 carbon atoms and $m$ is an integer from 2–20, the phosphorus atom having each of its valences satisfied by a terminal oxygen of one of said divalent radicals, the remainder of said divalent radicals terminating in alcoholic hydroxyl groups, there being at least three free alcoholic hydroxyl groups present in said phosphite.

3. A polyurethane comprising the reaction product of an organic polyisocyanate with a tris polyoxyalkylated phenol-formaldehyde resin phosphite, said resin being characterized by etherification of the resin molecule at the phenolic oxygen by a plurality of divalent unsubstituted polyoxyalkylene radicals having the formula $(R_2O)_m$ where $R_2$ is an oxyalkylene group having 2 to 3 carbon atoms and $m$ is an integer from 2 to 20, the phosphorus atom having each of its valences satisfied by a terminal oxygen of one of said divalent radicals, the remainder of said divalent radicals terminating in alcoholic hydroxyl groups, there being at least three free alcoholic hydroxyl groups present in the phosphite.

4. A product according to claim 3 in the form of a foam and wherein the polyisocyanate is toluene diisocyanate.

5. A polymer according to claim 3 wherein the phenol of the phenol-formaldehyde resin is an alkylated phenol in which the alkyl group has 1 to 24 carbon atoms and is in one of the ortho and para positions.

6. A polymer according to claim 5 wherein the phenol of the phenol-formaldehyde resin is an alkylated phenol in which the alkyl group has 1 to 12 carbon atoms, the phosphite employed for reaction with the polyisocyanate has a hydroxyl number between 35 and 200 and there are between 2 and 20 oxyalkylene groups per phenol unit.

7. A polymer according to claim 5 wherein the polyoxyalkylene radicals are polyoxypropylene radicals.

8. A polymer according to claim 3 wherein the phenol of the phenol-formaldehyde resin is phenol per se.

9. A product according to claim 3 wherein a polyalkylene ether polyol is employed in addition to the phosphite as an alcoholic hydroxyl containing material and wherein the polyisocyanate is an aromatic hydrocarbon diisocyanate.

10. A polymeric reaction product of an organic polyisocyanate with a polyoxyalkylated phenol-aldehyde resin phosphite, said resin being characterized by etherification of the molecule at the phenolic oxygens by a plurality of divalent unsubstituted polyoxyalkylene radicals having the formula $(R_2O)_m$ where $R_2$ is an oxyalkylene group having 2 to 3 carbon atoms and $m$ is an integer from 2 to 20, the phosphorus having its valences satisfied by a terminal oxygen of said divalent radicals, the remainder of said divalent radicals terminating in alcoholic hydroxyl groups, there being at least two free alcoholic hydroxy groups present in said phosphite.

11. A polymeric reaction product of an organic polyisocyanate with a polyoxyalkylated phenol aldehyde resin phosphite, said resin being characterized by etherification of the molecule at the phenolic oxygens by a plurality of polyhydroxypropyl groups, there being 2 to 20 oxypropyls in the polyoxypropyl, the phosphorus having its valences satisfied by esterification with said resin by removal of alcoholic hydroxy hydrogens therefrom, there being at least two free alcoholic hydroxyl groups present in said phosphite.

12. A product made by foaming the polymer of claim 2 in the presence of a foaming agent.

References Cited in the file of this patent

UNITED STATES PATENTS

| | | |
|---|---|---|
| 2,212,509 | Cherry | Aug. 27, 1940 |
| 2,716,099 | Bradley et al. | Aug. 25, 1955 |
| 2,950,262 | Bush et al. | Aug. 23, 1960 |
| 3,007,884 | Kaplan et al. | Nov. 7, 1961 |